May 18, 1926.
H. V. ATWELL
LIQUID AND MECHANICAL SEAL
Filed July 12, 1924
1,585,276
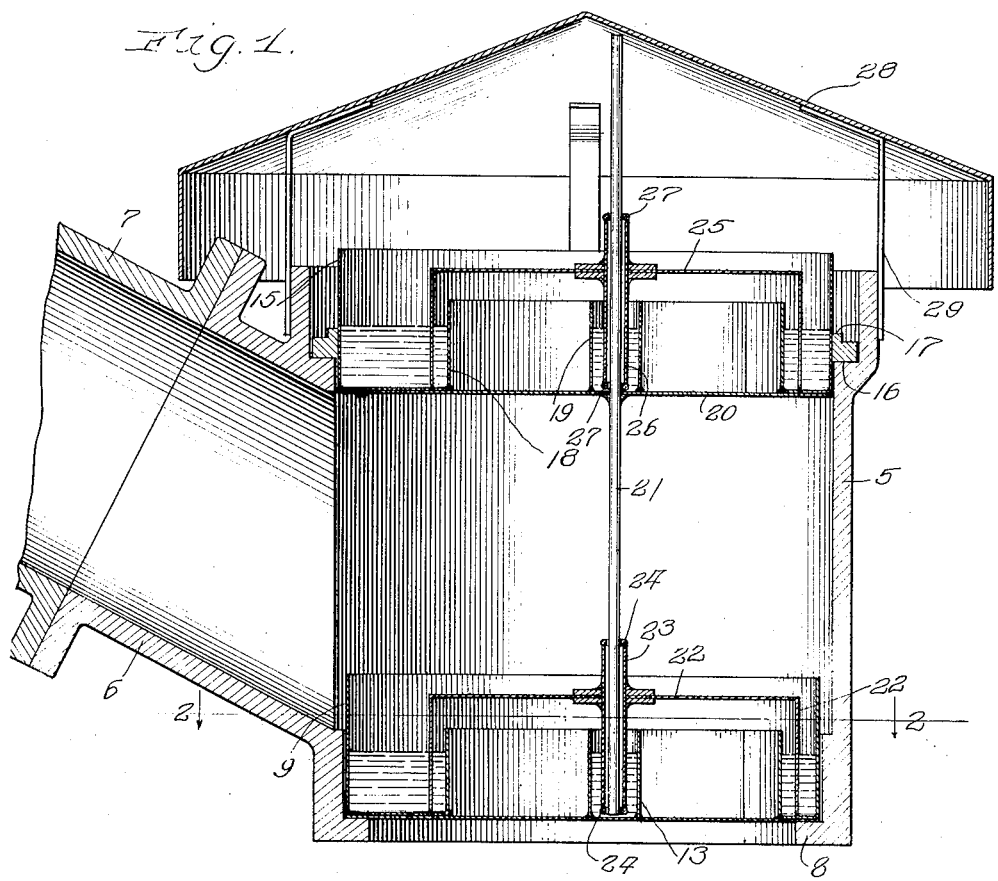
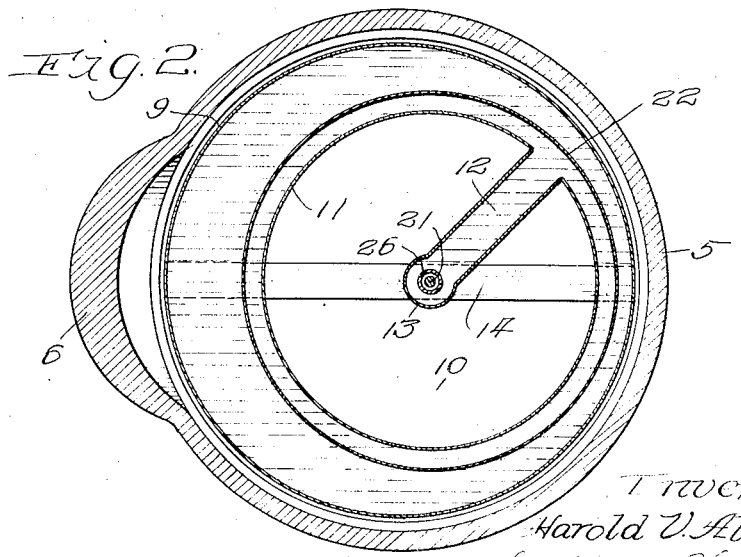

Patented May 18, 1926.

1,585,276

UNITED STATES PATENT OFFICE.

HAROLD V. ATWELL, OF WHITING, INDIANA, ASSIGNOR TO STANDARD OIL COMPANY, OF WHITING, INDIANA, AND CHICAGO, ILLINOIS, A CORPORATION OF INDIANA.

LIQUID AND MECHANICAL SEAL.

Application filed July 12, 1924. Serial No. 725,698.

The present invention relates to improvements in liquid and mechanical seals, more particularly of the type intended for connection to the vents of storage tanks containing volatile liquids, such as gasoline, crude petroleum and the like. It will be fully understood from the following description, illustrated by the accompanying drawings, in which:

Figure 1 is a vertical sectional view through a valve construction embodying the invention; and Fig. 2 is a horizontal sectional view on the line 2—2 of Fig. 1.

Referring more particularly to the drawings, the numeral 5 indicates a casing of generally cylindrical form, open at the top and bottom, and provided at an intermediate elevation with an inclined inlet connection 6, to which the vent pipe 7 from the vent in the upper portion of a storage tank (not shown) is connected.

In the lower portion of the casing 5, on a suitably ground internal flange 8, rests a cylindrical pan 9, which is formed with an eccentric opening of generally circular shape, this opening being designated by the numeral 10. The wall 11 surrounding this opening is formed to provide a radial channel 12 connecting the interior of the pan 9 with an approximately central cup 13. A strap 14 across the bottom of the pan aids in the support of the central cup.

In the upper portion of the casing 5 a pan 15, similar to the pan 9, is supported upon a ground shoulder 16 by means of a flange member 17 secured to the outer wall of the cop 15. The pan 15 is likewise provided with an eccentric central opening, the inner wall 18 of the pan 15 being formed, like the wall 11 of the pan 9, to provide a channel and an approximately central cup 19, the latter being in part supported by the strap 20 extending across the bottom of the pan. To the strap 20 is welded or otherwise suitably attached the vertical rod 21, which passes upwardly through the cup 19, and which projects downwardly into the cup 13.

Below the pan 15 an inverted cup 22 is slidably mounted upon the rod 21. The sides of this cup pass between the outer and inner walls of the pan 9. The cup 22 is provided approximately centrally with a tube 23, which projects on both sides of the top of the inverted cup 22, the downward projection entering the central cup 13 of pan 9. The tube 23 surrounds the rod 21, and is provided at its upper and lower ends with spaced bearing rings or surfaces 24, by which it is guided upon the rod. Above the cup 15 is provided an inverted cup 25 similar to the cup 22, the sides of the cup 25 entering the space between the inner and outer walls of the cup 15. The cup 25 is likewise provided with a central tube 26 surrounding the rod 21 and provided with spaced bearing surfaces or rings 27, the lower end of the tube 26 entering the cup 19.

The casing 5 may suitably be provided with a covering member or roof 28, supported by the straps 29.

The pans 9 and 15 are normally supplied with a liquid, such as water, glycerine, or the like, in the outer chamber surrounding their central openings, in the central cups 13 and 19 and in the channels leading thereto. The inverted cups 22 and 25 are freely movable vertically on the rod 21 above the pans 9 and 15 respectively. The side walls of the pan 22 normally rest in the body of liquid in the pan 9, the lower end of the tube 23 passing into the liquid in the central cup 13. Similarly the sides of the pans 25 normally rest in the liquid in the pan 15, the central tube 26 entering the liquid in the central cup 19.

In operation, when undue pressure is present in the vent pipe 7 and its connections, the pan 25 is forced to rise until a relief of the pressure is afforded, escape of vapor or gas around the rod 21 being prevented by the immersion of the tube 26 in the liquid body in the central cup 19. Upon release of pressure, the cup 25 returns to its normal position. During excess pressure in the vent pipe 7 and its connections, the inverted cup 22 is held in its normal position in the pan 9.

On reduced pressure in the vent 7, the cup 25 is held in its normal position, and the cup 22 is raised in a manner similar to that just described for the cup 25 until air is drawn in through the central opening 10 to a sufficient extent to reduce the vacuum to a point at which the cup 22 will drop and seal itself. The working pressures at which the cups 22 and 25 will operate may be predetermined by varying the weights of the cups, which, for light working pressures, may suitably be constructed of aluminum.

The construction permits of ready replacement and cleaning of its parts and is inexpensive to build. On removal of the roof 28, the pan 15 and rod 21 may be lifted out of the casing 5, leaving the pan 9 accessible. The pan 9 may also be readily lifted out of the casing after the pan 15 has been removed. The cups 22 and 25 are accurately guided by the rod 21, the widely separated bearing surfaces of the tubes 23 and 26 on the rod reducing friction and preventing binding of the cups in their movement.

Although the present invention has been described in connection with the specific details of a construction embodying it, it is not intended that these details shall be regarded as limitations upon the scope of the invention, except in so far as included in the accompanying claims.

I claim:

1. In a seal construction, an open ended casing having an intermediate inlet opening, pans in said casing above and below said opening, said pans being provided with central walled openings and being adapted to contain liquid, inverted cups resting in the liquid in said pans, and an approximately central guide rod passing through said cups, said cups being vertically movable on said guide rod.

2. In a seal construction, an open ended casing having an intermediate inlet opening, pans in said casing above and below said opening, said pans being provided with central walled openings and being adapted to contain liquid, cups located within said openings and communicating with the liquid chamber in said pans, an approximately central guide rod in said casing entering said cup, inverted cups resting in the liquid in said pans and guide tubes mounted on said inverted cups and surrounding said guide rod, said tubes entering cups within the openings in the pans.

3. In a seal construction, an open ended casing having an intermediate connection to the vent of a storage tank, a pan below the connection and having an eccentric opening providing an annular liquid chamber, a central liquid chamber connected therewith, a vertical guide rod in the casing entering the central liquid chamber, an inverted cup slidable on the guide rod and entering the annular chamber of the pan, and a tube secured to the inverted cup and surrounding the guide rod, said tube entering the central liquid chamber.

4. In a seal construction, a casing having inlet and outlet openings, a pan therebetween, said pan having a central walled opening forming an annular liquid chamber, a liquid chamber within the opening, a vertical guide rod entering the chamber, an inverted cup movable on said guide rod and entering the annular chamber of the pan, a tube secured to the inverted cup and surrounding the guide rod, said tube entering the central liquid chamber, and spaced bearing members provided on the interior of said tube to engage the guide rod.

HAROLD V. ATWELL.